United States Patent Office

2,730,518
Patented Jan. 10, 1956

2,730,518

BERYLLIUM HYDROXIDE AS CATALYST IN REACTING POLYESTERS WITH DIISOCYANATES

Arthur William Birley, Stevenage, John William Croom Crawford, Welwyn Garden City, and Alan William Jukes, Luton, England, assignors to Imperial Chemical Industries Limited, London, England, a corporation of Great Britain No Drawing. Application July 23, 1954,
Serial No. 445,454

Claims priority, application Great Britain July 31, 1953

11 Claims. (Cl. 260—75)

The present invention relates to improvements in the production of synthetic polymers and in particular to the production of synthetic polymers from diisocyanate-modified polyesters.

It is known that certain polyesters, e. g. poly(ethylene glycol adipate), may be reacted with diisocyanates to give compounds which may be converted by suitable treatment, e. g. reaction with water, glycols, diamines or other bifunctional compounds, to form synthetic polymers having properties similar to those of vulcanised natural rubber. In such processes it has been the practice to use polyesters having molecular weights of about 2,000 and to react these polyesters with a large excess of the diisocyanate in order to obtain a cured rubber-like material having a useful combination of properties. For example, where the curing was effected by the use of water it was found necessary to use from 1.4 to 1.6 moles of diisocyanate per mole of polyester, and with other bifunctional compounds, e. g. glycols, it was found necessary to use an even larger excess of diisocyanate, e. g. from 1.6 to 1.7 moles per mole of polyester to obtain similar results. Since the diisocyanate is the more expensive reactant, the use of such a large excess of this compound adds to the cost of the finished rubber-like material. In the processes used hitherto, it has not been possible to reduce the amount of diisocyanate used without adversely affecting the properties of the cured rubber-like material.

We have found that a polyester may be modified with much smaller amounts of diisocyanate and converted to a cured rubber-like material by subjecting the diisocyanate-modified polyester to an elevated temperature in the presence of a catalytic amount of an inorganic base, e. g. sodium, potassium, lithium, magnesium, barium or calcium hydroxide. Rubber-like material produced in this way do not suffer any serious deterioration in physical properties as compared with the rubber-like materials produced by the methods hereinbefore referred to, except in one important respect, viz. in their resistance to hydrolysis, which is considerably reduced. We have now found that if beryllium hydroxide is used as the catalyst for the conversion of the diisocyanate-modified polyester to a cured rubber-like material, there is little deterioration in the physical properties of the cured rubber-like material, and in particular in its resistance to hydrolysis.

According to the present invention, therefore, we provide a process for the production of a cured rubber-like material from a diisocyanate-modified polyester obtained by reacting, under substantially anhydrous conditions, an excess of a diisocyanate with a polyester having an average molecular weight of at least 1,000 and derived from at least one glycol and at least one dicarboxylic acid, said process being characterised in that the said diisocyanate-modified polyester is subjected to an elevated temperature in the presence of a catalytic amount of beryllium hydroxide.

By using polyesters having an average molecular weight of about 2,000 a rubber-like material having a good combination of properties is obtained when the amount of diisocyanate used to modify the polyester is from 1.1 to 1.25 moles per mole of polyester. Our process thus gives a considerable saving in the amount of diisocyanate used, and is also a much simpler process since it is not necessary to react the diisocyanate-modified polyester with water, glycol or other bifunctional compound. If it is desired, however, our process may also combine the use of a bifunctional compound, but we prefer in general not to use these compounds since the full advantage of our process is gained when the curing is effected by the use of beryllium hydroxide alone.

The diisocyanate-modified polyester is most conveniently prepared by reacting the polyester with the diisocyanate preferably at an elevated temperature, e. g. 120°–160° C. At temperatures within this range the reaction proceeds rapidly and is usually complete within a few minutes. In carrying out the reaction water must be excluded to a sufficient extent that the reaction proceeds essentially between the polyester terminal groups and the isocyanate groups. A small amount of water may be present and we have found that the reaction proceeds satisfactorily when the water content is about 0.1% of the weight of the reaction mixture.

In general we prefer to use aromatic diisocyanates since the aliphatic compounds tend to be less reactive. Examples of aromatic diisocyanates are 1-methylphenylene 2,4 diisocyanate; 2-nitrodiphenyl 4,4$^1$ diisocyanate; 2-nitrodiphenyl methane 4,4$^1$ diisocyanate; naphthylene 1,4 diisocyanate; naphthylene 1,5 diisocyanate; naphthylene 2,7 diisocyanate; fluorene diisocyanate; chrysane diisocyanate; 1-chlorophenylene 2,4 diisocyanate; tolylene diisocyanate; di-paraxylylmethane 4,4$^1$ diisocyanate; 4,4$^1$ diphenylene diisocyanate and 4,4$^1$ cyclohexylphenylene diisocyanate. Mixtures of diisocyanates may be used.

A compound containing more than two isocyanate groups may also be used if desired provided that such compound reacts in a predominantly bifunctional manner, e. g. as in the case of a triisocyanate in which one of the isocyanate groups is less reactive than the other two. Throughout this specification the term "diisocyanate" is to be understood as including such bifunctional polyisocyanates.

We prefer that the polyester should have mainly terminal hydroxyl groups and we accordingly prefer that the polyester should be prepared by reacting an excess of a glycol with a dicarboxylic acid. The preparation can be carried out by reacting about two moles of the glycol with about one mole of dicarboxylic acid by heating the two compounds together and distilling off water. The formation of the polyester is then completed by elimination of glycol by heating at 200–220° C. in vacuo at about 0.5 mm. of mercury pressure after the water has been distilled off at atmospheric pressure. The molecular weight of the polyester is influenced by the length of time during which the reaction mixture is heated at 200–220° C. in vacuo. For polyesters having a molecular weight of about 10,000 or more heating for several days may be necessary. The period of heating can be reduced by the use of known catalysts and by efficient stirring. The esterification product normally contains polyesters of varying molecular weight and these if desired may be separated, e. g. by fractional precipitation methods.

Examples of glycols from which polyesters may be prepared include, ethylene glycol, 1,2 propylene glycol, 1,3 propylene glycol, 2,3 butylene glycol, diethylene glycol and triethylene glycol. Examples of dicarboxylic acids with which glycols may be reacted are succinic, glutaric, adipic, pimelic, suberic, azelaic and sebasic acids. Polyesters obtained from mixtures of glycols, or mixtures of dicarboxylic acids, or both, and also mixtures of polyesters may be used in our invention.

It is necessary in preparing the diisocyanate-modified polyester that there should be more than one mole of diisocyanate per mole of polyester in order to form a diisocyanate-modified polyester having terminal isocyanate groups. The relative amount of diisocyanate will determine to what extent chain lengthening of the polyester molecules is allowed to proceed. Thus, when the amount of diisocyanate is only slightly more than one mole per mole of polyester there will be a considerable degree of chain lengthening. If an amount of diisocyanate used is greater than two moles per mole of polyester there will be substantially no chain lengthening of the polyester. The physical properties of the cured, rubber-like materials of our invention are controlled by their molecular weights and structures, and it is therefore necessary to vary the amount of diisocyanate which is used according to the molecular weight of the polyester.

We prefer that the diisocyanate modified polyester should have an average molecular weight greater than 5,000 and preferably within the range 7,500 to 12,500.

With polyesters having an average molecular weight of the order of 2,000, e. g. between 1,500 and 2,500, the desired degree of chain lengthening is achieved by using from 1.1 to 1.25 moles of diisocyanate per mole of polyester. We have found, for example, that a cured rubber-like material having a particularly good combination of properties may be obtained from the diisocyanate-modified polyester obtained by reacting one mole of poly(ethylene glycol adipate) having an average molecular weight of from 1,500 to 2,500 with from 1.1 to 1.25 moles of naphthylene 1,5 diisocyanate.

With polyesters having a high average molecular weight, e. g. greater than 5,000 and particularly those greater than 7,000, we prefer that there should be no substantial degree of chain lengthening. This can theoretically be achieved by using 2 moles of diisocyanate per mole of polyester, but it may be found desirable to use a slightly greater excess than the theoretical amount of diisocyanate. Too high a molecular weight in the polyester should be avoided since as the molecular weight is increased the amount of cross-linking in the cured rubber-like material is reduced. Also, with some very high molecular weight polyesters, there may be an increased tendency to crystallise which may affect the physical properties of the rubber-like material produced therefrom, e. g. there may be a tendency to cold-harden or to stretch embrittlement. For example, rubber-like materials derived from poly(ethylene glycol adipate) of average molecular weight of the order of 10,000 tend to cold harden. However, the use of high molecular weight polyesters may be an advantage with suitable compounds, since although the molar excess is increased, the actual excess on a weight basis is reduced.

The diisocyanate-modified polyester is converted into a cured rubber-like material by subjecting it to an elevated temperature, e. g. 140° C. to 170° C., in the presence of catalytic amounts of beryllium hydroxide. We prefer to use from 0.1% to 0.1% of beryllium hydroxide based on the weight of the diisocyanate-modified polyester since this amount of catalyst combines a rapid rate of curing with a good combination of physical properties in the cured rubber-like material.

The catalyst may be incorporated in the polyester before modification with the diisocyanate or it may be added to the diisocyanate-modified polyester. The properties of the final product will depend upon the uniformity of the reaction which proceeds when the diisocyanate-modified polyester is heated in the presence of the beryllium hydroxide, and it is therefore important that the catalyst should be uniformly dispersed throughout the diisocyanate-modified polyester. The catalyst may be dispersed efficiently in a stirred mixer, or using a masticating mixer, e. g. a mill or Banbury type mixer, depending upon the physical properties of the material into which it is dispersed.

The nature of the diisocyanate-modified polyester containing beryllium hydroxide may be varied according to the method by which the material is converted into a cured rubber-like material. The material may be either moulded in the form of a dough-like mass or it may be cast in a fluid state into a form required. It may, however, also be converted into the form of ribbon, film, sheets, filaments and dispersions for coatings and impregnations. For the production of moulded articles, the isocyanate-modified polyester containing the catalyst is mixed until it has a dough-like consistency. The production of a moulded rubber-like material is best achieved by heating the dough-like material to an elevated temperature of, for example, 140–170° C. for a period of, for example, 10–30 minutes, at a pressure of about 0.25 to 1 ton/square inch. The casting process may be carried out by first preparing the diisocyanate-modified polyester containing the catalyst so that little or no cross-linking takes place, pouring the material, if necessary at an elevated temperature, into an open mould and heating without pressure.

At any stage before the final curing reaction, ancillary ingredients, e. g. fillers, plasticisers, extenders, pigments or other materials may be incorporated.

In order to develop the physical properties to the maximum extent we prefer to subject the cured rubber-like material to a final heat treatment, e. g. at between 70° and 120° C. for a period of between 20 and 8 hours.

Our invention is illustrated, but in no way limited by the following example, in which all parts are given by weight.

*Example*

200 parts of polyethylene adipate of average molecular weight 1970 were melted and heated to 140–150° C. in a mechanical mixer. 26.7 parts of naphthylene 1,5 diisocyanate were mixed in and allowed to react for 20 minutes. At the end of this time 0.109 part of beryllium hydroxide were mixed in. After a further 20 minutes the chain lengthened diisocyanate-modified polyester had partially cured to a tough rubbery mass which was pressed directly into sheets using a template mould at 150° C. and 700 lb./sq. in. pressure for 15 minutes. The moulded sheets were then heat treated for 16 hours at 80° C. and they were then found to have a tensile strength of 6600 lb./sq. in. and an elongation at break of 640%. After 10 hours in steam at 100° C. the sheets had a tensile strength of 4300 lb./sq. in. with an elongation at break of 790%.

For purposes of comparison a second set of sheets were prepared as follows, using calcium hydroxide as the catalyst:

200 parts of polyethylene adipate of average molecular weight 1820 were melted and heated to 140–150° C. in a mechanical mixer. 28.8 parts of naphthylene 1,5 diisocyanate were then mixed in and allowed to react for 10 minutes. At the end of this time 0.204 part of calcium hydroxide was mixed in, causing the chain-lengthened diisocyanate-modified polyester to be converted to a tough rubbery mass after a further 15 minutes. This partially cured rubber was pressed into sheets at 150° C. under 700 lb./sq. in. pressure for 15 minutes.

The moulded sheets were heat-treated at 80° C. for 16 hours and the tensile strength was found to be 7,200 lb./sq. in, and the elongation at break 650%.

After treatment of the rubber with steam for 10 hours the tensile strength was found to be 1600 lb./sq. in. and the elongation at break 820%.

We claim:

1. A process according to claim 9 in which the diisocyanate used in the preparation of the diisocyanate-modified polyester is an aromatic diisocyanate.

2. A process according to claim 9 in which the diisocyanate-modified polyester is prepared by reacting at least 2 moles of diisocyanate with 1 mole of a polyester having an average molecular weight greater than 5,000.

3. A process according to claim 9 in which the diisocyanate-modified polyester is prepared by reacting between 1.1 and 1.25 moles of diisocyanate with 1 mole of a polyester having an average molecular weight of between 1,500 and 2,500.

4. A process according to claim 3 in which the polyester is poly(ethylene glycol adipate).

5. A process according to claim 1 in which the diisocyanate is naphthylene 1,5 diisocyanate.

6. A process according to claim 9 in which the amount of beryllium hydroxide used is from 0.01% to 0.1% based on the weight of the diisocyanate-modified polyesters.

7. A process according to claim 9 in which the diisocyanate-modified polyester is subjected to a temperature of between 140 and 170° C. in presence of the beryllium hydroxide.

8. A process according to claim 7 in which the cured rubber-like material obtained is subjected to a final heat treatment at between 70 and 120° C. for a period of between 20 and 8 hours.

9. In a process for the production of cured rubber-like material from a diisocyanate-modified polyester obtained by reacting under substantially anhydrous conditions (1) a polyester having terminal groups that are mainly hydroxyl groups and an average molecular weight of at least 1,000, said polyester being obtained by the reaction of at least one glycol and at least one dicarboxylic acid and (2) a diisocyanate present in excess of said polyester on a mol basis, the step comprising heating said diisocyanate-modified polyester at a curing temperature in the presence of a catalytic amount of beryllium hydroxide.

10. A cured rubber-like material produced by the process of claim 9, said material being characterized by its resistance to deterioration and hydrolysis.

11. A process according to claim 9 in which the diisocyanate-modified polyester is prepared by reacting at least 2 moles of diisocyanate with 1 mole of polyester having an average molecular weight within the range of 7,500 to 12,500.

No references cited.